(12) United States Patent  
Pomare

(10) Patent No.: US 8,575,887 B1
(45) Date of Patent: Nov. 5, 2013

(54) UNIVERSAL CHARGING HOLSTER FOR CHARGING AND TRANSPORTING PORTABLE ELECTRONIC DEVICES

(76) Inventor: Eduardo Pomare, Missouri City, TX (US)

( * ) Notice: Subject to any disclaimer, the term of this patent is extended or adjusted under 35 U.S.C. 154(b) by 226 days.

(21) Appl. No.: 12/942,021

(22) Filed: Nov. 9, 2010

Related U.S. Application Data

(60) Provisional application No. 61/259,607, filed on Nov. 9, 2009.

(51) Int. Cl.
*H02J 7/00* (2006.01)

(52) U.S. Cl.
USPC ............ 320/101; 320/138; 320/139; 136/291

(58) Field of Classification Search
USPC ......................................................... 320/101
See application file for complete search history.

(56) References Cited

U.S. PATENT DOCUMENTS

| | | | |
|---|---|---|---|
| 6,084,379 A | 7/2000 | Buniatyan | |
| 6,184,654 B1 | 2/2001 | Bachner, III et al. | |
| 6,281,425 B1 | 8/2001 | Price | |
| 6,339,311 B1 * | 1/2002 | Caldwell | 320/101 |
| 6,566,842 B1 * | 5/2003 | Kirkpatrick | 320/101 |
| 6,870,089 B1 * | 3/2005 | Gray | 136/251 |
| 7,508,163 B2 * | 3/2009 | Batts-Gowins | 320/105 |
| 2002/0158602 A1 | 10/2002 | McNair, Jr. | |
| 2002/0171391 A1 * | 11/2002 | Batts-Gowins | 320/103 |
| 2003/0128010 A1 * | 7/2003 | Hsu | 320/101 |
| 2004/0239287 A1 * | 12/2004 | Batts-Gowins | 320/103 |
| 2005/0231159 A1 | 10/2005 | Jones, Sr. et al. | |
| 2006/0028166 A1 * | 2/2006 | Closset et al. | 320/101 |
| 2006/0238365 A1 * | 10/2006 | Vecchione et al. | 340/657 |
| 2009/0021214 A1 * | 1/2009 | Foster et al. | 320/114 |
| 2009/0023481 A1 | 1/2009 | Foster et al. | |
| 2009/0230783 A1 * | 9/2009 | Weed et al. | 307/150 |

* cited by examiner

Primary Examiner — Yalkew Fantu
(74) Attorney, Agent, or Firm — Kenneth A. Roddy

(57) ABSTRACT

A belt supported universal charging holster for charging and transporting portable electronic devices includes a built-in charging battery, at least one photovoltaic cell, a controller circuit, an ON/OFF switch, an indicator light, and a cable connected with the controller circuit having a DC electrical jack at a free end which serves as a DC input/output port. A plurality of adapter plugs are provided that have one end connectable in the input/output port of the cable and a second end connectable with the charging port of different portable electronic devices for charging the device battery. The charging battery of the holster may be reenergized by the photovoltaic cell or by an external power source connected with the input/output port of the cable by a USB adapter plug. The adapter plugs may include a mini-LED flashlight connectable with the port of the cable.

9 Claims, 3 Drawing Sheets

UNIVERSAL CHARGING HOLSTER FOR CHARGING AND TRANSPORTING PORTABLE ELECTRONIC DEVICES

CROSS REFERENCE TO RELATED APPLICATION

This application claims priority of U.S. Provisional Patent Application Ser. No. 61/259,607 Filed Nov. 9, 2009.

BACKGROUND OF THE INVENTION

1. Field of the Invention

This invention relates generally to portable electric chargers for portable electronic devices, and more particularly to a belt supported universal charging holster having a battery charging system which is configured to contain portable electronic devices that are equipped with a rechargeable battery and recharges the devices using a built-in charging battery which is reenergized by solar energy or an external electrical power source.

2. Background Art

As used herein, the term "portable electronic device" refers to cellular telephones, digital cameras, and small portable electronic devices having the capability to store large amounts of digital data and/or media, and which are equipped with a limited power supply, such as a rechargeable battery, which must be re-charged from an external source, and a charging port for receiving a recharging plug for recharging the battery. These portable memory storage devices are capable of storing digital files, such as image files, music files, and video files. Some examples of portable memory storage devices include: cell phones, digital cameras, portable audio and video players (MP3 and MP4 players), personal digital assistants (PDA's), and other digital devices.

Cell phones and portable electronic devices have increased dramatically in capability and popularity, while decreasing in size and expense. Power utilization of conventional handheld electronic devices vary significantly depending on the application and use of the device. For example, a handheld computing device uses significantly more energy to process user inputs and display information within user interfaces such as thin film transistor active matrix displays (TFT displays). Other electronic devices, such as some conventional cellular telephones, consume energy based on a user's interaction with a wireless network. Advancements in wireless networks may also increase power utilization of some electronic devices. For example, as cellular phones and handheld computing devices migrate to high-speed wireless networks, power consumption of electronic devices may increase as a function of communicating and processing data via high-speed communication networks. This may result in more frequent charging of electronic devices.

Most portable electronic devices are provided with a charging port which receives a plug at the end of a flexible power cord of a conventional battery charger having a conventional AC connector at the other end for attaching the charger to a power source, such as a conventional 110v AC wall outlet, or provided with a plug which is typically connected in a cigarette lighter receptacle or power receptacle of a vehicle which allows the device to be charged via a 12v DC power source.

However, the battery of the portable electronic device may become weak or discharged when the charger is not readily available or the user is not in their vehicle.

There are several patents that are directed toward various chargers for electronic devices that utilize photovoltaic cells which allow the portable electronic device to be recharged using solar power.

Foster et al, U.S. Published applications 2009/0021214 and 2009/0023481 disclose a portable electronic device carrier with a charging system having a built-in charging port which, in one embodiment, comprises a first and second electrical conductor contacts which are in the form of elongate leads or wires that extend along the inner surface of the interior compartment so as to be engaged by an electrical interface which is plugged into the charging port of the portable electronic device when the device is placed into the interior compartment. Alternatively, a connector may be located at the end of a pair of leads extending from the battery which may be plugged into the port of the portable electronic device, or the charging port may be configured to generate an energy field and the portable electronic device provided with an interface such as a coil to generate electricity from the field.

McNair, Jr., U.S. Published application 2002/0158602 discloses a combination traveling and protective bag with photovoltaic battery cells for handheld video game systems or electrical devices. The traveling bag comprises photovoltaic cells colligated into the travel bag for recharging an extra set of replacement battery cells. Special pivoting mounts of the photo voltaic cells allow minute adjusting to achieve the best angle toward the light source. The traveling bag has perforations that allow a user to access the hand held video game system or electrical device viewing screen, operation and command buttons while the travel bag is being used. The travel bag also comprises one or more clips for using a shoulder or holding strap. When the batteries are recharged a special sound alerts the user. Removable sections on the travel bag allow the user to change and upgrade the photovoltaic cells.

Gray, U.S. Pat. No. 6,870,089 discloses a portable storage apparatus in the form of a backpack, a cooler or carrying case, for storing an electronic device which includes at least one solar panel intergrated as a part of an exterior surface of the storage apparatus, a conductive element electrically coupled between the at least one solar panel and a universal twelve-volt charge port, wherein the universal twelve-volt charge port is operable to couple converted solar energy to charge a rechargeable battery of the electronic device; and a layer of material, not directly coupled to the solar panel, covering the solar panel and coupled to the material of the exterior surface of the storage apparatus.

Price, U.S. Pat. No. 6,281,425 discloses an apparatus and method for recharging a handheld computing device using solar power which includes a recharger housing having a first slot for receiving a handheld computing device. A solar panel support member having a solar panel is slidably attached to the recharger housing and recharges the handheld computing device when the solar panel support member is in an extended position.

Buniatyan, U.S. Pat. No. 6,084,379 discloses a solar powered recharging device for providing an additional charging capability for a personal communication device which includes a solar panel that is secured to a surface of the personal communication device or a battery power source. The solar panel is in communication with the personal communication device or a battery power source that is electrically coupled to the personal communication device for continuously supplying power the personal communication device or the battery power source.

SUMMARY OF THE INVENTION

The present invention overcomes the aforementioned problems and is distinguished over the prior art in general, and these patents in particular by a belt supported universal charging holster for charging and transporting a variety of portable electronic devices that includes a built-in charging battery, at least one solar panel or photovoltaic cell, a controller circuit, an ON/OFF switch, an indicator light, and a power cable connected with the controller circuit having a DC electrical jack at an outer end which serves as a DC input/output port. A plurality of adapter plugs are provided that have one end configured to be connected in the input/output port at the free end of the cable and a second end configured to be connected with the charging port of various different portable electronic devices for charging the battery of the device. The built-in charging battery of the holster may be selectively reenergized by the solar panel or photovoltaic cell or by an external power source connected with the input/output port of the cable by a USB adapter plug. The adapter plugs also include a mini-LED flashlight accessory that can be connected with the input/output port of the cable.

DESCRIPTION OF THE PREFERRED EMBODIMENT

Figure 1:
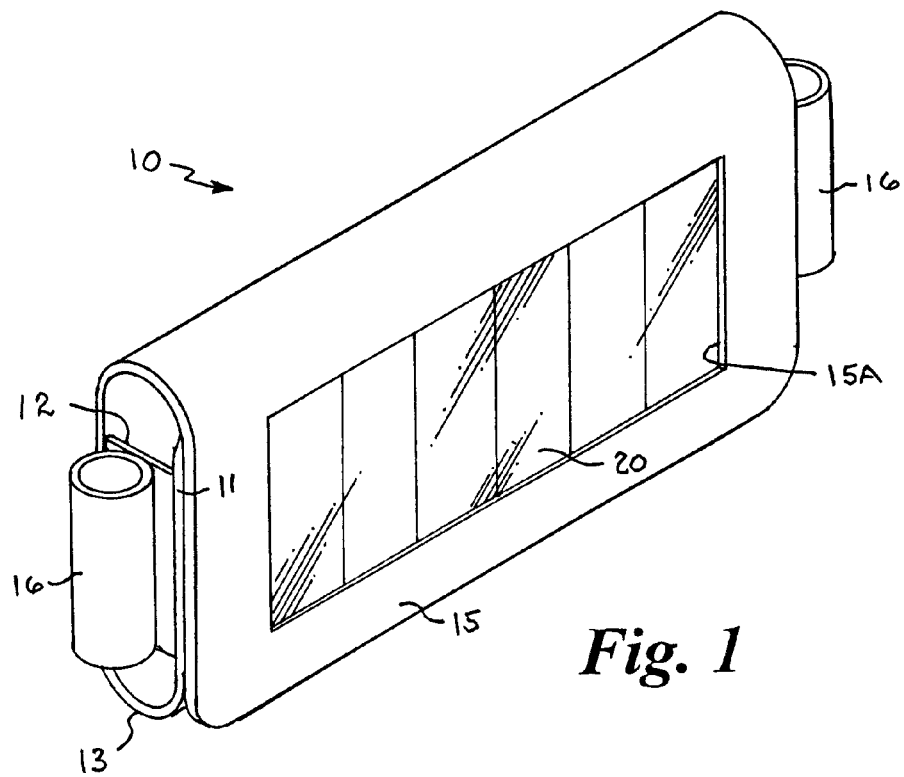
FIG. 1 is a perspective view showing the charging holster in accordance with the present invention from the front in a closed position.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention utilizes several adapter plugs which are depicted in the drawings for purposes of example only, and it should be understood that the adapter plugs may be of any type that is capable of being connected to a mating charging port of a cell phone, digital camera, or other portable electronic device for charging the battery of the device. It should also be understood that the interior components of the adapter plugs described herein and the internal electronic circuitry are of standard conventional construction and well known in the art, and therefore, are represented somewhat schematically and not shown or described in detail.

Figure 2:
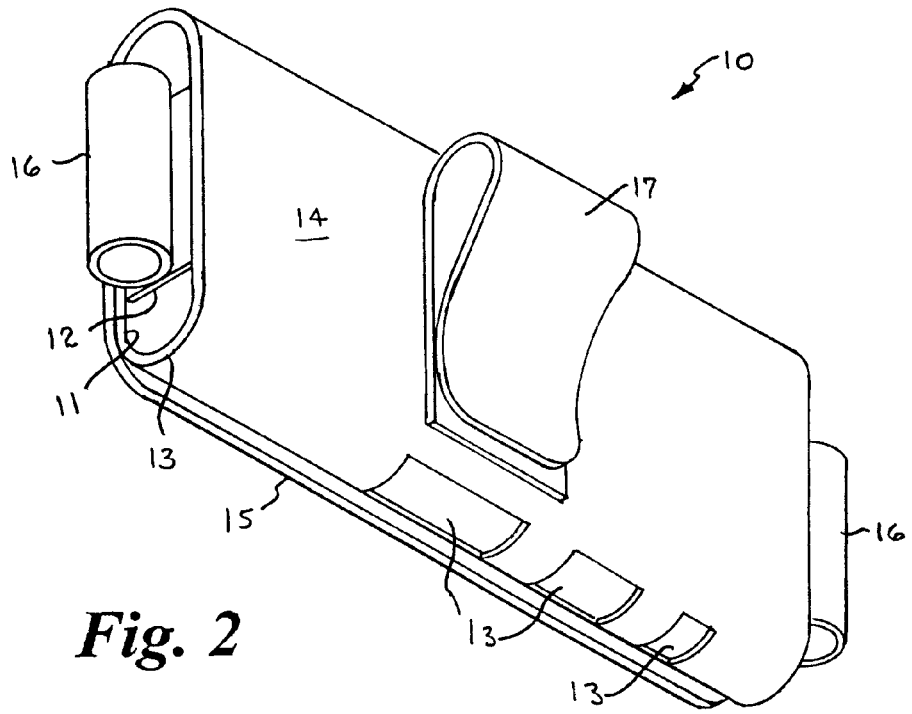
FIG. 2 is a perspective view showing the bottom and rear of the charging holster in a closed position.
Figure 3:
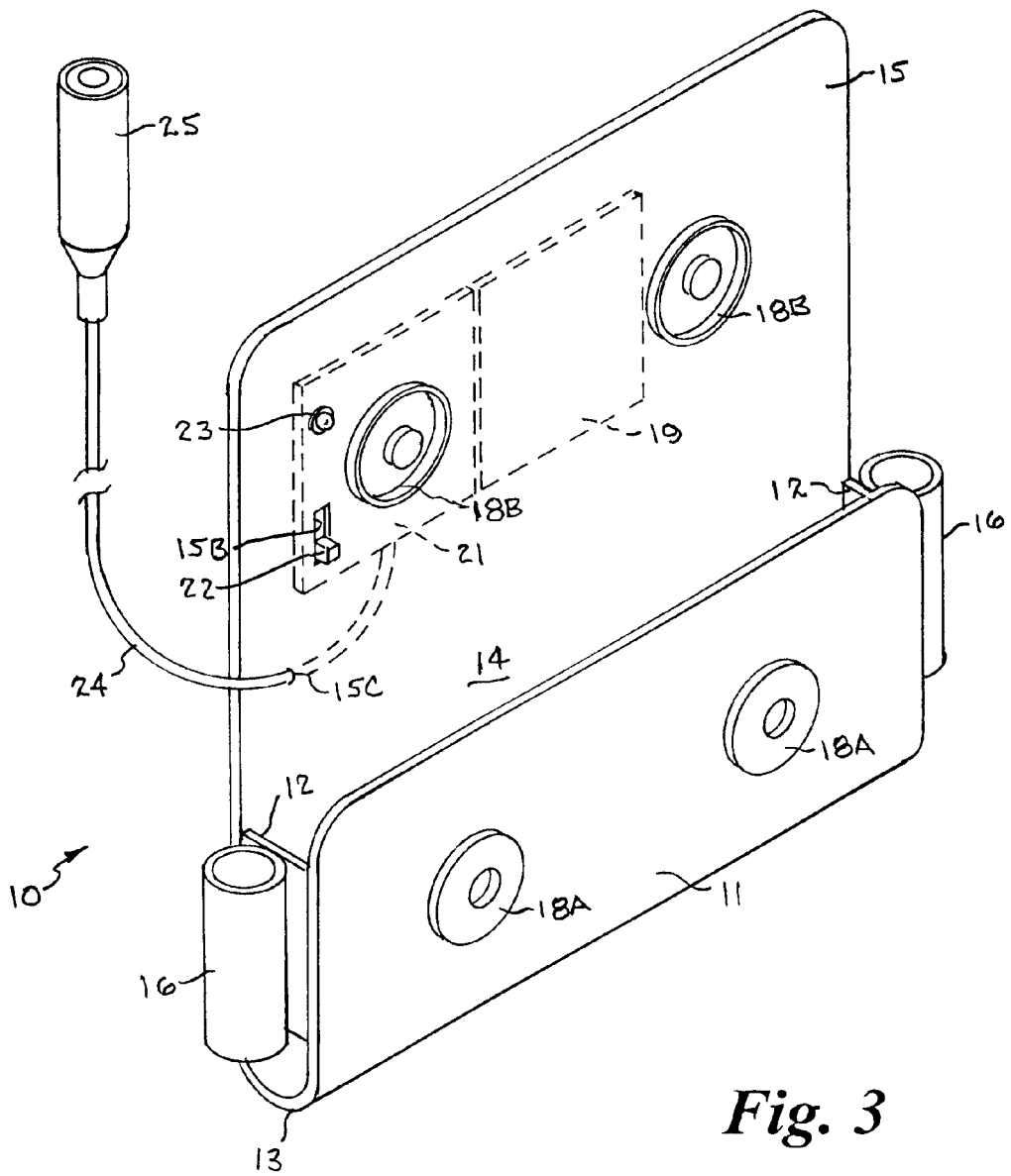
FIG. 3 is a perspective view showing the charging holster in an open position.

Referring now to the drawings by numerals of reference, there is shown in FIGS. 1, 2, and 3, a example of a preferred case or holster 10 having a battery charging system which is configured to removably contain a portable electronic device and which attaches to a belt, so that the contained device may be carried or transported. The charging system includes a built-in charging battery which is reenergized by a solar panel or photovoltaic cell unit or by an external electrical power source, as described in detail hereinafter.

In the example illustrated in FIGS. 1, 2, and 3, the case or holster 10 is formed of a flexible material and is configured to contain a cell phone or other portable electronic device, and has a generally rectangular front panel 11, laterally opposed end panels 12, a bottom panel 13, and a rear panel 14 which define an interior compartment having an open top end. The rear panel 14 extends over and covers the open top end of the interior compartment and forms a generally rectangular flap portion 15 which overlaps and covers the front panel 11 in a closed position, as seen in FIG. 1. The end panels 12 may be provided with tubular sleeves 16 for holding various accessories.

As seen in FIG. 2, the bottom panel 13 may be provided with apertures 13A therethrough for accessing various buttons and/or ports of a portable electronic device contained in the holster 10. As seen in FIG. 2, the rear panel 14 is provided with a belt clip 17 for removably attaching the holster 10 to the belt of a user.

As illustrated in FIG. 3, the flap portion 15 may be raised upwardly and rearwardly to gain access to the open top end and interior compartment of the holster. Suitable fasteners 18A, 18B are provided on the outer side of the front panel 11 and the underside of the flap portion 15 for releasably securing the flap in the closed position. In the illustrated example the fasteners 18A, 18B are shown to be magnetic snap fasteners, however, it should be understood that other conventional fasteners may be used, such as hook and loop fasteners, or zippers.

The charging system of the holster 10 includes a built-in charging battery 19, at least one solar panel or photovoltaic cell 20, a controller circuit 21, an ON/OFF switch 22, an indicator light 23 connected with the controller circuit, and a power cable 24 with leads connected with the controller circuit 21 at one end and has a DC electrical jack which serves as a DC input/output port 25 at the opposed end.

In the illustrated example, the flap portion 15 is formed of two plies of material, the outer facing ply having an opening 15A, and the solar panel or photovoltaic cell 20 is secured to the flap portion such that its light receiving surface is exposed through the opening. The controller circuit 21 which may be implemented in a printed circuit board or a microprocessor chip is disposed between the plies of the flap portion 15. The ON/OFF switch 22 is disposed between the plies of the flap portion with its movable member extending through an opening 15B in the inner facing ply of the flap portion. The indicator light 23, which may be mounted on the circuit board of the controller circuit 21, is disposed between the plies of the flap portion 15 and extends through an opening 15C in the inner facing ply of the flap portion. The power cable 24 extends through an opening in the inner facing ply of the flap portion.

In a preferred embodiment suitable for charging cell phone, the solar panel or photovoltaic cell 20 is rated at 5.5 V/60 mA or 5.5 V/70 mA. A preferred built-in charging battery 19 is a rechargeable 5.5V 600 mAh/800 mAh lithium polymer battery having a maximum output voltage of 5.5V and a maximum output current of 500 mA. The solar panel or photovoltaic cell 20 generates electricity when exposed to light and is connected with the built-in charging battery 19 through the controller circuit 21, the ON/OFF switch 22, and indicator light 23 so as to charge the built-in charging battery.

The controller circuit 21 controls the flow of electricity to the built-in charging battery 19 and protects against overcharging.

As discussed above, the present charging holster 10 may be used for charging a variety of different portable electronic devices, such as cellular telephones, digital cameras, and other small portable electronic devices such as portable audio and video players (MP3 and MP4 players), personal digital assistants (PDA's), and other digital devices which are equipped with a limited power supply, such as a rechargeable battery, which must be re-charged from an external source. These devices are typically provided with a charging port which receives various types of recharging plugs for recharging the battery of the device.

Figure 4:
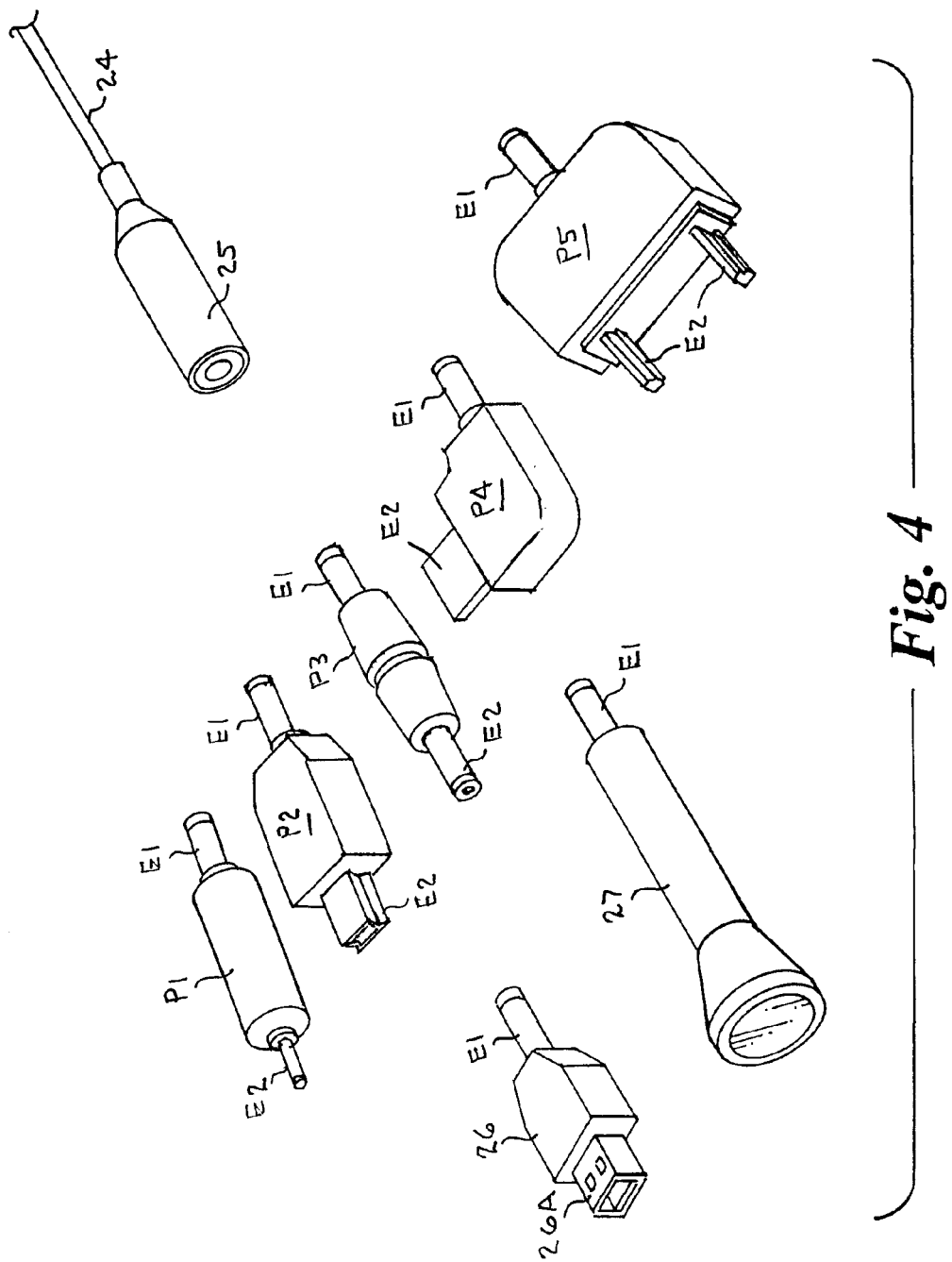
FIG. 4 is an exploded perspective view showing the tubular electrical receptacle of the cable of the charging holster that serves as the DC input/output port and a plurality of adapter plugs that may be connected with the input/output port for charging various portable electronic devices.

As shown in FIG. 4, the present invention includes a plurality of adapter plugs P1 through P5 that may be installed in the DC electrical jack or DC input/output port 25 at the free end of the power cable 24 for charging various different portable electronic devices. Each of the adapter plugs P1-P5 is provided with a first male plug end E1 which can be installed in the socket of the DC electrical jack or DC input/output port 25 at the free end of the power cable 24, and each has a second male plug end E2 which is configured to be received in the charging port of the particular device, to electrically connect the built-in charging battery 19 and charging system of the holster 10 with the rechargeable battery of the portable electronic device.

The adapter plugs include a DC to USB adapter plug 26 that has a male plug E1 at a first end which can be installed in the socket of the DC electrical jack or DC input/output port 25 at the free end of the power cable 24, and a USB plug 26A at a second end which can be installed in the charging port of a portable electronic device having a USB charging port to electrically connect the built-in charging battery 19 and charging system of the holster 10 with the rechargeable battery of the device. The DC to USB adapter plug 26 can also be plugged into a USB port of a computer to electrically connect the power supply of the computer with the built-in charging battery 19 and charging system of the holster 10 to recharge the built-in charging battery of the holster, as described hereinafter.

The adapter plugs also include a mini-LED flashlight 27 accessory that has a male DC plug E1 at one end which can be installed in the socket of the DC electrical jack or DC input/output port 25 at the free end of the power cable 24, to provide a convenient source of light.

Operation

It should be understood from the foregoing that the DC electrical jack or DC input/output port 25 at the free end of the power cable 24 may be used not only for providing DC output power for charging various different portable electronic devices, but also may be used for inputting DC power from an external power source to recharge or reenergize the built-in charging battery 19.

Charging the Built-in Charging Battery of the Holster

Before charging the built-in charging battery 19, the ON/OFF switch 22 on the holster 10 should be moved to the "OFF" position. Energy may be stored in the built-in charging battery 19 in the following ways:

(1) Placing the solar panel or voltaic cell 20 in direct sunlight. When the solar panel 20 is operational, the indicator light 23 will be illuminated.

(2) The DC to USB adapter plug 26 may be used to recharge or reenergize the built-in charging battery 19 by connecting it in the socket of the DC electrical jack or DC input/output port 25 at the free end of the power cable 24, and plugging the USB plug 26A at its second end into a USB port of a computer to electrically connect the power supply of the computer with the built-in charging battery 19 and charging system of the holster 10. When the charging circuit is operating, the indicator light 23 will be illuminated, and when the charging battery is fully charged, the indicator light will go off. When using the solar panel 20 to charge the built-in charging battery 19, it is recommended that the built-in charging battery be allowed to charge for 15-20 hours to regain a full charge.

The indicator light 23 will also indicate a weak or exhausted condition of the built-in charging battery 19, which may occur when the charging battery has not been used for several days, or may have become exhausted. If the illumination of the indicator light 23 is weak when the solar panel 20 is placed in direct sunlight, that is an indication that the built-in charging battery 19 is weak and may not have sufficient power to charge the device. If the indicator light 23 does not become illuminated when the solar panel 20 is placed in direct sunlight; that is an indication that the built-in charging battery may be exhausted. These conditions are easily overcome by using the DC to USB adapter plug 26 to charge the built-in charging battery. When using the DC to USB adapter plug 26 to charge the built-in charging battery 19, it is recommended that the built-in charging battery be allowed to charge for 2-3 hours to regain a full charge.

Charging the Portable Electronic Device

To use the built-in charging battery 19 to charge the battery of the portable electronic device such as a cell phone, the ON/OFF switch 22 on the holster 10 is moved to the "ON" position. An adapter plug P1-P5 that is compatible with the charging port of the portable electronic device or cell phone is selected and connected with the DC electrical jack or DC input/output port 25 at the free end of the power cable 24. When the charging circuit is operating, the indicator light 23 will be illuminated, and the charging status will also be indicted by the display on the cell phone, or other portable electronic device if the portable electronic device has a charging status display. When the battery of the cell phone or portable electronic device is fully charged, the indicator light 23 will go off. When using the built-in charging battery to charge the battery of the mobile phone or portable electronic device, it is recommended that the built-in charging battery 19 be allowed to charge the battery of the device 1-2 hours to regain a full charge of the battery of the device.

Using Flashlight Accessory

To use the mini-LED flashlight 27, the plug E1 at its end is connected in the socket of the DC electrical jack or DC input/output port 25 at the free end of the power cable 24. The mini-LED flashlight may be turned on by moving the ON/OFF switch 22 on the holster to the "ON" position, and may be turned off by moving the switch to the "OFF" position.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A universal charging holster for charging and transporting a variety of portable electronic devices, comprising:
   a holster formed of a flexible material and having a generally rectangular front panel, laterally opposed end panels, a bottom panel, and a rear panel defining an interior compartment for housing a portable electronic device having a rechargeable battery and a charging port, said rear panel extending over and covering said open top end of said interior compartment and forming a generally rectangular flap portion which overlaps and covers said front panel in a closed position, and mating fastener means on said flap portion and said front panel for releasably securing said flap portion and said front panel together in the closed position;
   a charging system including a charging battery secured to said holster, at least one photovoltaic cell secured to said holster and coupled with said charging battery, a controller circuit, an ON/OFF switch, and an indicator light, secured to said holster and coupled with said photovoltaic cell and said charging battery;
   a power cable coupled at one end with said controller circuit and having a DC electrical jack at an outer free end;
   a plurality of interchangeable adapter plugs each having one end configured to be connected in said jack of said power cable and a second end configured to be connected with the charging port of a portable electronic device contained in said holster for charging the rechargeable battery of the portable electronic device; and
   a power source adapter plug having one end configured to be connected in said jack of said power cable and a second end configured to be connected with an external DC power source; wherein;
   said charging battery of said holster may be selectively reenergized by electricity generated by said at least one photovoltaic cell or by the external DC power source connected with said power source adapter plug connected in said jack of said power cable.

2. The universal charging holster according to claim 1, wherein
   said plurality of interchangeable adapter plugs include a power source adapter plug having one end configured to be connected in said jack of said power cable and said second end is a USB plug configured to be connected with a USB port of an external device having a DC power supply for utilizing the power supply of the external device to reenergize said charging battery of said holster.

3. The universal charging holster according to claim 1, further comprising:
   at least one aperture in said holster for accessing buttons and/or ports of the portable electronic device contained in said holster.

4. The universal charging holster according to claim 1, further comprising:
   a mini-LED flashlight having one end configured to be connected in said jack of said power cable to be powered by said charging battery of said holster.

5. The universal charging holster according to claim 1, further comprising:
   mounting means on a back side of said holster for removably attaching said holster to the belt of a user.

6. The universal charging holster according to claim 1, further comprising:
   a tubular sleeve on said holster for holding said jack of said power cable.

7. The universal charging holster according to claim 1, further comprising:
   apertures through said holster in communication with said interior compartment adapted to allow access therethrough to control buttons and ports of the portable electronic device contained in said interior compartment.

8. The universal charging holster according to claim 1, wherein
   said flap portion is formed of two plies of material, an outer facing ply having an opening, and said the photovoltaic cell is secured to said flap portion such that its light receiving surface is exposed through said opening.

9. The universal charging holster according to claim 8, wherein
   said controller circuit is disposed between said two plies of material of said flap portion;
   said ON/OFF switch is disposed between said two plies of material of said flap portion and has a movable member extending through an opening in said inner facing ply of said flap portion.

* * * * *